United States Patent [19]

Taylor

[11] 3,877,308

[45] Apr. 15, 1975

[54] PYROELECTRIC TEMPERATURE COMPENSATED SENSING APPARATUS

[75] Inventor: Allen L. Taylor, Woodbury Township, Washington County, Minn.

[73] Assignee: Minnesota Mining and Manufacturing Company, St. Paul, Minn.

[22] Filed: Jan. 2, 1974

[21] Appl. No.: 430,055

[52] U.S. Cl............ 73/362 CP; 73/355 R; 250/338; 317/247; 317/262 F
[51] Int. Cl......... G01k 7/34; G01j 5/34; H01v 3/02
[58] Field of Search.......... 73/355 R, 355 E, 355 M, 73/362 CP, DIG. 4; 250/338; 317/235 Q, 247, 262 F; 136/213; 357/28

[56] References Cited
UNITED STATES PATENTS

| 2,540,194 | 2/1951 | Ellett | 317/262 F X |
| 3,448,348 | 6/1969 | Stadler | 73/362 CP X |
| 3,453,432 | 7/1969 | McHenry | 73/355 R X |
| 3,480,777 | 11/1969 | Astheimer | 317/247 X |
| 3,657,644 | 4/1972 | Beam et al. | 73/355 R X |

Primary Examiner—Richard C. Quiesser
Assistant Examiner—Frederick Shoon
Attorney, Agent, or Firm—Alexander, Sell, Steldt & DeLaHunt

[57] ABSTRACT

A pyroelectric temperature compensated sensing apparatus having two portions of spaced apart poled pyroelectric material, each portion having an electrically conductive plate on each planar surface thereof. The conductive plates of both portions are electrically strapped together to form two sets, and a sensing circuit is electrically connected between the two sets for sensing electrostatic charges thereon.

8 Claims, 7 Drawing Figures

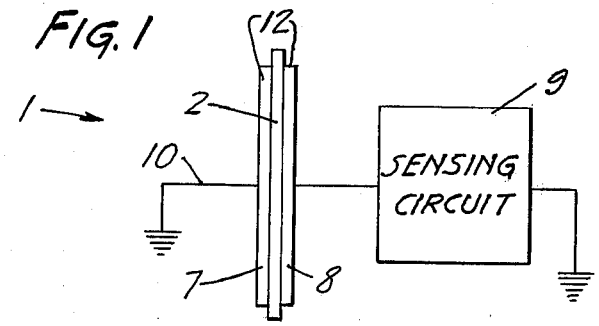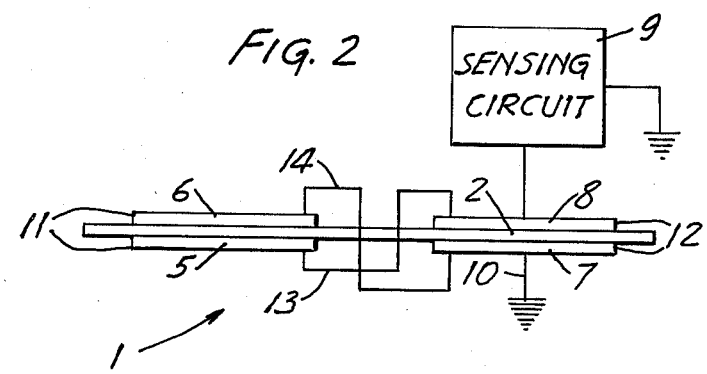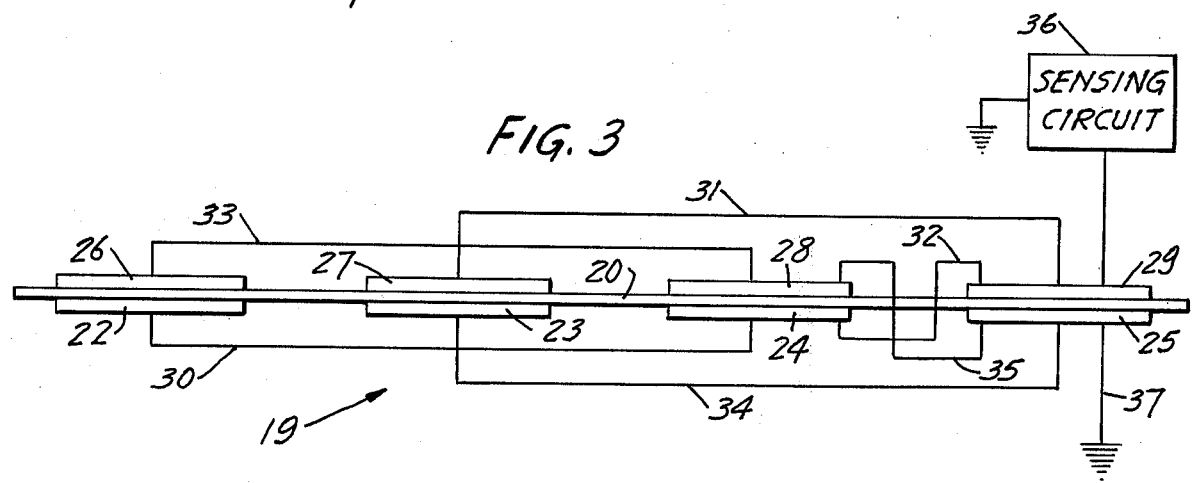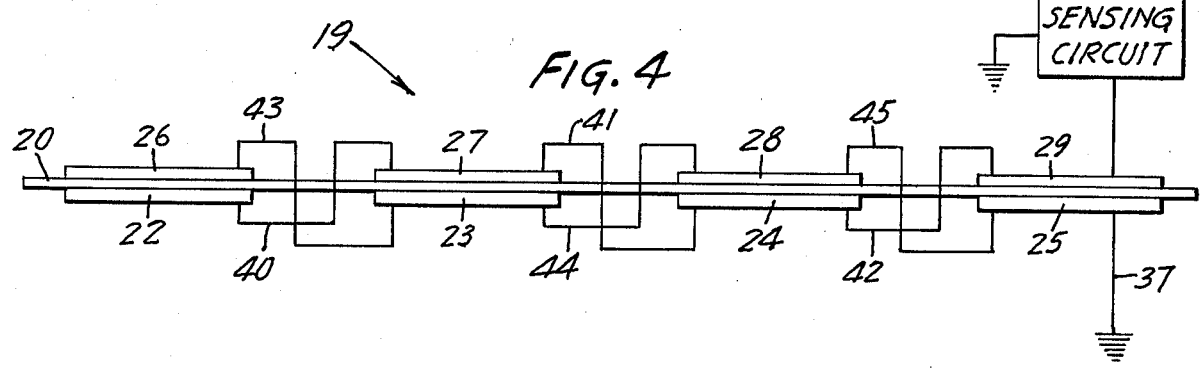

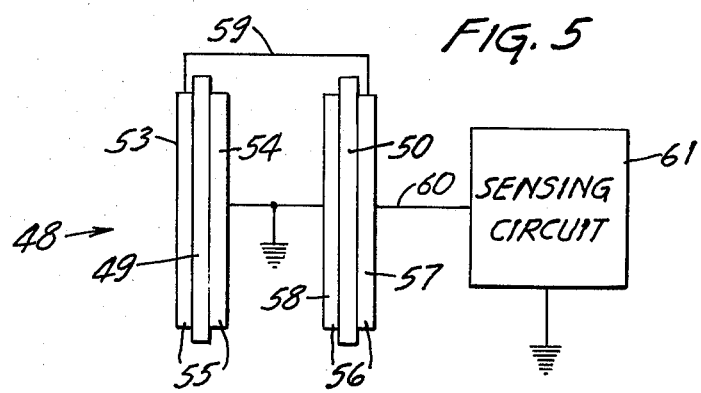
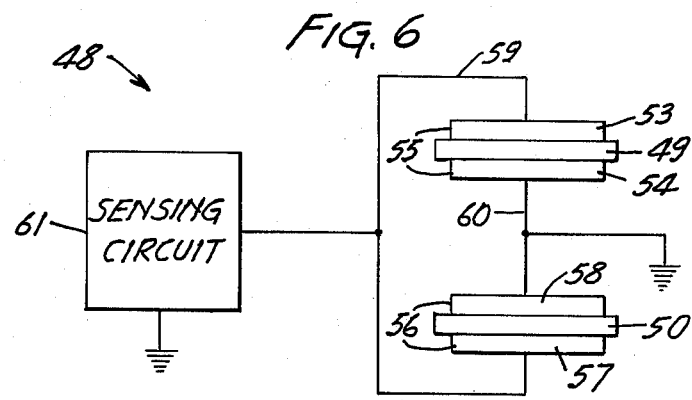
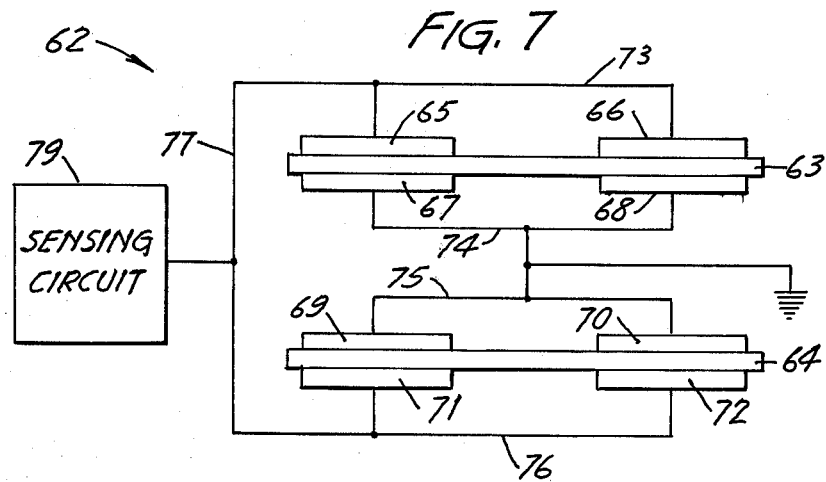

PYROELECTRIC TEMPERATURE COMPENSATED SENSING APPARATUS

BACKGROUND OF THE INVENTION

1. Field of the Invention

The present invention relates in general to pyroelectric materials and more specifically to the use of such materials in a temperature compensated sensing apparatus.

2. Description of the Prior Art

Poled pyroelectric materials exhibit the unique characteristic that they develop voltage potentials across their thickness when subjected to a change in ambient temperature. Accordingly, pyroelectric materials are useful in detectors that depend on the sensing of temperature changes for their detection. However, a primary shortcoming with the use of pyroelectric material in such detectors is that there has been no simple, inexpensive, reliable method for providing temperature compensation of the pyroelectric material. Yet, temperature compensation is essential to insure that pyroelectric detectors do not indicate a detection that is merely due to a rise in the ambient temperature of the environment in which they are operated.

The present invention provides a precision temperature compensated sensing apparatus that is employable in various types of detectors and overcomes the above described shortcoming in prior art detectors using pyroelectric material.

SUMMARY OF THE INVENTION

The present invention provides a temperature compensated sensing apparatus formed of two portions of spaced apart pyroelectric material, each portion having a pair of conductive plates in surface-to-surface contact therewith. The plates of one pyroelectric portion are interconnected to the plates of the other pyroelectric portion to form two sets of plates, and a sensing circuit is electrically connected between the sets of plates for sensing electrical signals thereon.

In a first embodiment the two portions of pyroelectric material are part of a single pyroelectric layer and each pair of conductive plates includes a first plate disposed on one side of the pyroelectric layer and a second plate disposed on the opposite side of the pyroelectric layer opposite the first plate. A first means connects the first plate of one pair to the second plate of the other pair to form a first interconnected set of plates, and a second means connects the second plate of the one pair to the first plate of the other pair to form a second interconnected set of plates.

When the ambient temperature of the entire pyroelectric layer is varied, electrostatic charges appear on each of the interconnected plates, but the charges are negated due to the interconnections made between the plates. However, when the temperature of the pyroelectric layer is selectively varied from its ambient temperature, a net electrostatic charge is produced on only one pair of the plates and a voltage potential exists between the plates of that pair. A sensing circuit means is connected with the charged pair of plates and is employed to respond to such potential. The sensing means may include an alarm which is actuated by such potential to provide a perceptible indication of a selective variation of the temperature of the pyroelectric layer.

The present invention is not limited to the use of only two pair of conductive plates with the pyroelectric layer. To the contrary, a large number of the pairs of plates may be employed, with each additional pair adding to the sensitivity and accuracy of the apparatus. For example, a second preferred embodiment is disclosed having four pairs of conductive plates disposed in surface-to-surface contact on opposite sides of the pyroelectric layer and interconnected to form two sets.

Instead of being formed from a single pyroelectric layer, the two pyroelectric portions may be physically unconnected except for electrical connections between the plates as represented by a third preferred embodiment. Such embodiment is particularly advantageous because it provides a sensing apparatus with a temperature compensating scheme that can be employed in a wide variety of constructions.

The above described embodiments provide a temperature compensated sensing apparatus that is basically simplistic in construction, but yet affords accurate and reliable sensing by the use of the pyroelectric material. In addition, the present invention also provides a durable and readily manufactureable sensing device that employs no electronic switching to accomplish its temperature compensation.

BRIEF DESCRIPTION OF THE DRAWINGS

FIG. 1 is an end view of a temperature compensated sensing device representing a first preferred embodiment of the present invention;

FIG. 2 is a plan view of the sensing device of FIG. 1;

FIG. 3 is a plan view of a second preferred embodiment of the present invention;

FIG. 4 is a plan view of a modified embodiment of that shown in FIG. 3;

FIG. 5 is an end view of a third preferred embodiment of the present invention;

FIG. 6 is a plan view of the embodiment of FIG. 5; and

FIG. 7 is a plan view of a fourth preferred embodiment of the present invention.

DESCRIPTION OF THE PREFERRED EMBODIMENTS

Referring now to the drawings and with specific reference first to FIGS. 1 and 2, a first preferred embodiment of the temperature compensated sensing device of the present invention is illustrated at 1. The sensing device 1 is formed of a rectangular layer 2 of pyroelectric material and a number of thin rectangular conductive plates 5, 6, 7 and 8 in surface-to-surface contact with the layer 2. A sensing circuit 9 is connected with the plate 8, and the plate 7 is electrically grounded at 10. While it is convenient to have one continuous layer of material for the layer 2, it is not necessary to the operation of the device that the layer between the various plates 5–8 be one continuous layer.

The layer 2 may be formed, for example, from a thin sheet of polyvinylidene fluoride or a ceramic plate of lanthanum-modified lead zirconate-titanate that is preferably uniformly poled with regard to direction and magnitude of poling. Although a few pyroelectric materials have dipoles that are naturally aligned in a poled relationship, normally the dipoles of pyroelectric materials are essentially arranged in random fashion. These dipoles can be rearranged in orientation when a pyroelectric material is heated above a particular temperature known as the poling temperature.

At the poling temperature, the dipoles of a pyroelectric material will orient themselves in accordance with an applied electric field. The degree of dipole orientation is a function of the temperature to which the pyroelectric material is heated, the applied field strength and length of time the field is applied. For example, substantial poling begins in polyvinylidene fluoride when it is heated to a temperature greater than 90° C with an electric field of at least 4,000 volts per millimeter of thickness applied for approximately 15 minutes. Increasing the temperature and/or the applied electric field will progressively increase the degree of poling achieved up to a maximum of saturation.

Once a pyroelectric material is poled and then cooled below its poling temperature, the applied field may be removed and the dipoles will remain as oriented by the applied field. The pyroelectric material will thereafter produce opposite electrostatic charges on its planar surfaces when heated or cooled from its ambient temperature. Care should be taken though to insure that the material is not heated above its poling temperature for extended periods in order that the dipoles are not permitted to return to a random orientation.

The conductive plates 5, 6, 7 and 8 preferably are formed by coating each side of the layer 2 with a material having good conductive characteristics, such as copper, and then etching the material to form the separate plates. The plates 5 and 7 are both located on one side of the layer 2 in a spaced apart relationship, and the plates 6 and 8 are spaced from one another and positioned on the opposite side of the layer 2 substantially opposite the plates 5 and 7, respectively. The plates 5–8 are arranged therefore in substantially parallel pairs, a first pair 11 formed of the plates 5 and 6 and a second pair 12 formed of the plates 7 and 8.

Leads 13 and 14 serve as electrical connecting means for respectively connecting the plates 5 and 8 together in one set and the plates 6 and 7 together in a second set. The plates 5 and 8 preferably are substantially equal in surface areas, as are the plates 6 and 7. Consequently, if layer 2 between the plate pairs 11 and 12 is cooled or heated electrostatic charges equal in magnitude but opposite in polarity exist on the plates of each pair 11 and 12. Since plates 5 and 8 are interconnected and of opposite charge and plates 6 and 7 are interconnected and of opposite charge no net charge will appear between interconnected plates 5, 8 and plates 6, 7. The sensing circuit 9 is electrically connected across plates 5, 8 and plates 6, 7 for sensing electrical charges that may be present due to selective heating or cooling of layer 2. The sensing circuit 9 may be an ammeter, a volt meter or other type circuitry for producing an indication that such electrostatic charges are present.

The spacing between the plates 5 and 7, and 6 and 8 is substantially greater than the thickness of the pyroelectric layer 2. Consequently, variations in the temperature of any one of the plates 5, 6, 7 or 8 produce like variations in substantially the entire cross section of that portion of the layer 2 contacting the temperature varied plate, without producing appreciable variation from the ambient temperature of that portion of the layer 2 interposed between the two plates not subject to the temperature varying influence. As a result, electrostatic charges of opposite polarities are developed on each side of the temperature varied portion of the layer 2 but no charges are developed on the remaining portion of the layer 2 that is not temperature varied.

Because the layer 2 is relatively nonconductive the charges that are developed on the temperature varied portions of the layer 2 do not disperse onto the remaining portions thereof. Instead, the charges accumulate on the temperature varied plates 5 and 6, or the plates 7 and 8.

The temperature compensating operation of the device 1 is dependent upon the heating or cooling of only one pair of the plates 5 and 6 or 7 and 8 when the device is exposed to the particular condition that it is adapted to sense. Such selective heating or cooling may be accomplished in a variety of ways, depending upon the form of the condition to be detected. For example, a radiant source that includes heat energy may be sensed by the use of a slotted housing that permits only one of the plates 5, 6, 7 or 8 to be exposed to the radiation at any one time as described in my copending application entitled "Motion and Temperature Sensitive Infrared Detector" and filed on the same day herewith. A condition giving rise to the presence of gaseous substance may be detected by coating one of the plates 5–8 with an agent that produces a chemical reaction when in the presence of the gaseous substance to be detected, which reaction results in heat as described in my other copending application entitled "Pyroelectric Carbon Monoxide Detector" and also filed on the same day herewith.

To more fully describe the present invention, an explanation of its operation will now be described assuming that the temperature of the plate 5 has been changed in some manner such as by one of the selective methods detailed above. It should be understood, however, that the operation described would be similar if the temperature of the plates 6–8 were changed. A change in the temperature of the plate 5 produces a like change throughout the entire cross section of the portion of the pyroelectric layer 2 in contact with the plate 5. As a result, electrostatic charges which are opposite in polarity are generated by such portion of layer 2 and appear on the plates 5 and 6. The polarity and magnitude of such charges depend on the poling of the layer 2. The electrostatic charge on the plate 5 is distributed between the unheated plate 8 and the heated plate 5 via the interconnection 13 while the charge on plate 6 is similarly distributed between plates 6 and 7 via the connector 14. The sensing circuitry 9 responds to the charge between plates 5, 8 and plates 6, 7, to provide a sensing indication of the condition being detected.

In contrast to the above detection operation of the present invention, variation in the ambient temperature of all the plates 5–8 and the intermediate layer 2 between such plates does not present an electrostatic charge to the sensing means 9 since the electrostatic charges of opposite polarity generated by layer 2 between plates 5 and 6 and between plates 7 and 8 are equal in magnitude and are negated by the interconnection provided between plates 5, 8, 6 and 7. In this way compensation for a change in the ambient temperature of the layer 2 between plates 5 and 6 and between plates 7 and 8 is accomplished in a reliable simplistic manner through the natural pyroelectric characteristics of the layer 2. Although the foregoing description relates to a device 1 having a uniformly poled pyroelectric layer 2 and conductive plates 5–8 equal in surface area, it is not essential to the present invention that the plates 5–8 are equal in surface area. Instead, it may be desirable to have the plates 5 and 7 different in size than the plates 6 and 8. For example, although uniform poling of the layer 2 may be sought, it is likely because of practical problems in poling that all portions of the layer 2 will not be poled with exactly the same magnitude of poling. Thus, a variation in the electrostatic charges developed on the surfaces of the layer 2 will result when the ambient temperature of the layer 2 is altered. To compensate for such variation in developed electrostatic charges, a plate that overlies a portion of the layer 2 having an unusually high or low magnitude of poling may be varied in size so that it will accumulate the same amount of electrostatic charge as that accumulated by the plate that it is interconnected with. Accordingly, plate size variations may play an important role in providing accurate and reliable sensing by the device 1.

To increase the sensitivity of the present invention a second preferred embodiment represented by the device 19, as shown in FIG. 3, may be employed. The device 19 has a pyroelectric layer and conductive plate construction similar to that of the device 1, but differs from the device 1 in the number of plates it includes. Forming the device 19 is a pyroelectric layer 20 having spaced apart plates 22, 23, 24 and 25 disposed in surface-to-surface contact on one side, and spaced apart plates 26, 27, 28 and 29 in surface-to-surface contact with the other side. To obtain the same operational temperature compensation advantage offered by the device 1, the plates 22, 24, 27 and 29 are electrically connected together by leads 30, 31 and 32, and the plates 23, 25, 26 and 28 are connected together by leads 33, 34 and 35. A sensing circuit 36 is connected between plate 29 and ground. The plate 25 is grounded at 37. This embodiment affords an increased accumulation of electrostatic charge for sensing than that provided by the first embodiment because of the addition of more conductive plates on the layer 20. As evidenced by this embodiment any number of additional plates may be further added so long as the total surface areas of the interconnected plates on each side of the layer are equal. Although the plates 22, 24, 27 and 29 are, in effect, connected in parallel with one another as are the plates 23, 25, 26 and 28, such connections are not essential to the present invention. As an alternative, a series type connection scheme may be utilized, as indicated by FIG. 4, wherein lines 40, 41 and 42 interconnect the plates 22, 24, 27 and 29; and the lines 43, 44 and 45 interconnect the plates 23, 25, 26 and 28.

The use of a single layer of pyroelectric material in the above described embodiments provides advantages in manufacture and assembly, but the principles of the present invention may be employed in a wide variety of other embodiments as indicated by a sensing device 48, shown in FIGS. 5 and 6, that represents a third preferred embodiment. The sensing device 48 includes a first portion 49 of poled pyroelectric material and a second portion 50 of pyroelectric material that preferably has substantially the same degree of poling as the first portion 49. In contrast to the previously described embodiments, the two pyroelectric portions 49 and 50 have no physical connection with one another. Although the portions 49 and 50 are shown in FIGS. 5 and 6 as being parallel to one another, there is no correlation between the operation of the present invention and the positioning of the portions 49 and 50 except for the requirement that in performing a sensing operation, only one of the portions 49 or 50 must be temperature varied by the particular condition that the device 48 is adapted to sense, while the temperature of the other portion remains unchanged.

Disposed in surface-to-surface contact with the portion 49 are conductive plates 53 and 54 that form a first pair of plates 55, and disposed in surface-to-surface contact with the portion 50 is a second pair of plates 56 formed of the plates 57 and 58. Leads 59 and 60 serve as electrical connecting means for respectively connecting the plates 53 and 57 together in one set and the plates 54 and 58 together in a second set. Preferably, the plates 53, 54, 57 and 58 are all the same size so that when the portions 49 and 50 are temperature varied the electrostatic charges that appear on the plate 53 will be substantially equal in magnitude but opposite in polarity to the charges on the plate 57, and the same will be true of the charges appearing on the plates 54 and 58. However, the plates 53 and 57 may differ in size from the plates 54 and 58 if the degree of poling of the portions 49 and 50 differ with respect to such difference in size of the plates to maintain the above charge relationship between the plates 53, 54, 57 and 58. Thus, the operation of the device 48 is similar to that of the apparatus 1 in that no net electrostatic charge will exist on the plates 53, 54, 57 and 58 when both pyroelectric portions 49 and 50 are temperature varied. However, when only one of the portions 49 or 50 is temperature varied detectable electrostatic charges will appear on the plates contacting the temperature varied portion and such charges will be sensed by a circuit 61 that is operatively connected between the sets of plates 53, 57 and 54, 58.

Selective heating of the portions 49 and 50 may be provided in a wide variety of ways; for example, the portions 49 and 50 may be enclosed in a housing with an opening that is positioned to expose only one of the portions 49 or 50 to the condition desired to be detected. Thus, this embodiment of the present invention provides a high flexibility of construction to meet particular sensing needs.

Referring now to FIG. 7, a sensing device 62 is shown that represents a fourth preferred embodiment of the present invention and includes two pyroelectric portions 63 and 64. Plates 65–72 are disposed on the portions 63 and 64 respectively and are connected by leads 73–77 to form two sets of plates between which a sensing circuit 79 is operatively connected. As was true of the second embodiment shown in FIG. 3, this embodiment provides high sensing sensitivity due to the plurality of plates 65–72.

What is claimed is:

1. A pyroelectric temperature compensated sensing apparatus comprising the combination of:

a layer of poled pyroelectric material that produces electrostatic charges on its surfaces when its ambient temperature is varied, the charges on one surface being opposite in polarity to the charge on the other surface;

a plurality of pairs of conductive plates in surface-to-surface contact with said pyroelectric layer, each pair of plates including a first plate disposed on one surface of said layer, and a second plate substantially disposed opposite said first plate on the opposite surface of said layer;

connecting means for electrically interconnecting various plates of said pairs to form two sets of interconnected plates, each set includes at least one plate on one side of said layer and at least one plate on the opposite side of said layer; and a sensing means connected between said two sets for detecting electrostatic charges on said two sets.

2. A sensing apparatus as recited in claim 1 wherein said layer of pyroelectric material is uniformly poled, and the conductive plates are substantially equal in size.

3. A sensing apparatus as recited in claim 1 wherein the poling of the pyroelectric material is nonuniform and the plates connected to the sensing means are varied in size to compensate for such nonuniform poling.

4. A sensing apparatus as recited in claim 1 wherein said set of plates are of such size that a uniform variation in the ambient temperature of said pyroelectric layer produces electrostatic charges on each surface of said layer which are equal in magnitude, but opposite in polarity.

5. A sensing apparatus as recited in claim 1 wherein said connecting means includes:

first means for interconnecting two pairs of plates whereby the first plate of one of said pairs is connected to the second plate of the other of said pairs to form a first interconnected set of plates; and second means for interconnecting said pairs of plates whereby the second plate of said one of said pairs is connected to the first plate of said other of said pairs to form a second interconnected set of plates.

6. A pyroelectric temperature compensated sensing apparatus comprising the combination of:

a layer of uniformly poled pyroelectric material;

at least two pairs of conductive plates in surface-to-surface contact with said pyroelectric layer, each pair of plates including a first plate disposed on one side of said layer, and a second plate disposed opposite said first plate on the opposite side of said layer;

first means for connecting the first plate of one of said pairs to the second plate of the other of said pairs to form a first interconnected set of plates, each of said interconnected plates having substantially the same amount of surface area;

second means for connecting the second plate of said one of said pairs to the first plate of said other of said pairs to form a second interconnected set of plates, each of said interconnected plates having substantially the same surface area; and sensing means connected between said first and second sets of interconnected plates for sensing electrostatic charges on said first and second sets.

7. A pyroelectric temperature compensated sensing apparatus comprising the combination of:

a layer of uniformly poled pyroelectric material;

a plurality of pairs of conductive plates in surface-to-surface contact with said pyroelectric layer, each pair of plates including a first plate disposed on one side of said layer, and a second plate disposed opposite said first plate on the opposite side of said layer;

first means for interconnecting two pairs of plates whereby the first plate of one of said pairs is connected to the second plate of the other of said pairs to form a first interconnected set of plates, each of said interconnected plates having substantially the same amount of surface area;

second means for interconnecting two pairs of plates whereby the second plate of said one of said pairs is connected to the first plate of said other of said pairs to form a second interconnected set of plates, each of said interconnected plates having substantially the same surface area; and sensing means connected between said first and second sets of interconnected plates for sensing electrostatic charges on said first and second sets.

8. A pyroelectric temperature compensated sensing apparatus comprising the combination of:

a portion of poled pyroelectric material that produces electrostatic charges on its surfaces when its ambient temperature is varied, the charges on a first surface of said portion being opposite in polarity to the charges on the second surface of said portion;

a first pair of conductive plates in surface-to-surface contact with said pyroelectric portion, said pair of plates including a first plate disposed on said first surface of said portion, and a second plate disposed on said second surface of said portion;

a second pair of conductive plates in surface-to-surface contact with said pyroelectric portion, said second pair of plates including a first plate disposed on said first surface of said portion, and a second plate disposed on said second surface of said portion;

connecting means for electrically interconnecting said first plate of said first pair of conductive plates with said second plate of said second pair of conductive plates to form a first set of interconnected plates, and for electrically interconnecting said second plate of said first pair of conductive plates with said first plate of said second pair of conductive plates for forming a second set of interconnected plates; and a sensing means electrically connected between said two sets of plates for detecting electrostatic charges on said two sets.

* * * * *